(12) United States Patent
Zook

(10) Patent No.: US 6,504,664 B1
(45) Date of Patent: Jan. 7, 2003

(54) LOCATING INDEX MARK IN ROTATING MAGNETIC STORAGE MEDIA

(75) Inventor: Christopher P. Zook, deceased, late of Longmont, CO (US), by Nancy Phares-Zook, legal representative

(73) Assignee: Cirrus Logic, Inc., Freemont, CA (US)

( * ) Notice: Subject to any disclaimer, the term of this patent is extended or adjusted under 35 U.S.C. 154(b) by 0 days.

(21) Appl. No.: 09/632,632

(22) Filed: Aug. 4, 2000

(51) Int. Cl.$^7$ ................................................. G11B 5/09
(52) U.S. Cl. ...................... 360/51; 360/77.8; 360/78.14; 360/72.2; 360/49
(58) Field of Search ........................... 360/77.08, 78.14, 360/72.2, 51, 49

(56) References Cited

U.S. PATENT DOCUMENTS 5,978,170 A * 11/1999 Izumiya et al. .......... 360/78.14

* cited by examiner

Primary Examiner—Alan T. Faber
(74) Attorney, Agent, or Firm—Nixon & Vanderhye, P.C.

(57) ABSTRACT

A rotating storage medium has an index mark-indicating sequence recorded thereon, the index mark-indicating sequence comprised of bits distributed over plural servo wedges. The index mark-indicating sequence is comprised of at least one bit in each of a specified number of plural servo wedges per track, the specified number forming a subset of the servo wedges of the rotating storage medium. The specified number (subset) of plural servo wedges per track preferably is comprised of the servo wedge which contains the index mark a predetermined number (m−1) of consecutive servo wedges. The subset of plural servo wedges may be positioned to precede and include the servo wedge which physically contains the index mark, or may be offset therefrom. Both the synchronization marks of the plural servo wedges and the index mark-indicating sequence are preferably fault tolerant. The bits used to form the sequence (which is checked against a predefined reference index mark-indicating sequence) are preferably recorded in synchronization marks of the specified number of plural servo wedges per track, and particularly in a sequence entry bit thereof.

54 Claims, 6 Drawing Sheets

LOCATING INDEX MARK IN ROTATING MAGNETIC STORAGE MEDIA

BACKGROUND

1. Field of the Invention

The present invention pertains to storage and retrieval of information relative to rotating storage medium, and particularly to locating an index mark on rotating storage medium.

2. Related Art and other Considerations

Typically a rotating magnetic storage medium is pre-recorded upon manufacture to include certain servo information, usually in the form of servo wedges. The servo information includes an index mark which appears in only one servo wedge per track and which is important for providing a precise position reference on the rotating storage medium. As explained below, locating the index mark can be problematic in some circumstances.

In accordance with prior art formatting for rotating magnetic storage medium, servo information is recorded in each of plural servo wedges located at equal radial intervals on the medium. Each prior art servo wedge begins with a preamble, which is followed by a synchronization mark and a servo data field. One value in the servo data field (e.g., the first bit of servo data field) is set to a value to indicate whether the servo wedge is the index wedge for the track.

It will be appreciated that if there is an error in reading the index mark (e.g., in reading the bit of servo data field used for signifying the index mark), the index mark-search operation is frustrated. For this reason, prior art rotating magnetic storage drives typically rotate the medium several times to ensure consistent results for locating the index mark. Unfortunately, the additional rotations and reading of several tracks to check for consistent indication of the index mark cost time.

What is needed, therefore, and an object of the present invention, is method and apparatus for easily locating an index mark on rotating storage medium, as well as a rotating storage medium pre-formatted to facilitate efficient location of the index mark.

BRIEF SUMMARY OF THE INVENTION

A rotating storage medium has an index mark-indicating sequence recorded thereon, the index mark-indicating sequence comprised of bits distributed over plural servo wedges. The index mark-indicating sequence is comprised of at least one bit in each of a specified number of plural servo wedges per track, the specified number forming a subset of the servo wedges of the rotating storage medium. The specified number (subset) of plural servo wedges per track can be a predetermined number of consecutive servo wedges positioned immediately before an index mark, or the subset can be offset from (before or after) the servo wedge which includes the index mark by a predetermined number of servo wedges.

An index mark search operation is performed as an aspect of a method of the invention for operating a drive. In accordance with the index mark search operation, a sequence is dynamically formed from bits extracted from each of plural servo wedges read from the rotating storage medium. As a new servo wedge is read, a bit from the new servo wedge is included in the sequence, with an oldest bit of the sequence being shifted out of the sequence. Upon the reading of each servo wedge, the contents of the sequence is compared with a predefined reference index mark-indicating sequence. The comparison is used to locate an index mark on the rotating storage medium.

The invention further encompasses a drive for a rotating storage medium. The drive comprises a transducer for reading servo wedges pre-recorded on the medium. A register is employed to store a sequence of servo information exacted from predetermined positions of plural servo wedges read by the transducer. A comparitor compares contents of the register with a predefined index mark-indicating sequence for ascertaining an index mark recorded on the medium.

In another aspect, the invention concerns a controller for a drive which reading servo wedges pre-recorded on the medium. The controller includes the register in which the sequence is stored and the comparitor, as well as an input information (buffer) manager which, for each of plural servo wedges read by the transducer, makes an entry in the shift register.

In yet another aspect, the invention involves apparatus and method for pre-formatting a rotating storage medium so that the index mark-indicating sequence is distributed over plural servo wedges.

Both the synchronization marks of the plural servo wedges and the index mark-indicating sequence are preferably fault tolerant. The bits used to form the acquired sequence (which is checked during the index mark search operation against the predefined reference index mark-indicating sequence) are preferably recorded in synchronization marks of the specified number of plural servo wedges per track, and particularly in a sequence entry bit thereof. In view of the fault tolerant nature of the synchronization mark, the sequence entry bit from which the sequence entry value is acquired is chosen so that a nominal synchronization mark has a first value (e.g., zero) in the sequence entry bit, while the variant but acceptable synchronization mark has a second value (e.g., one) in the sequence entry bit. The values from the sequence entry bits of consecutive servo wedges are thus used to form a value in a register, which value is checked against the predetermined reference index mark-indicating sequence.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
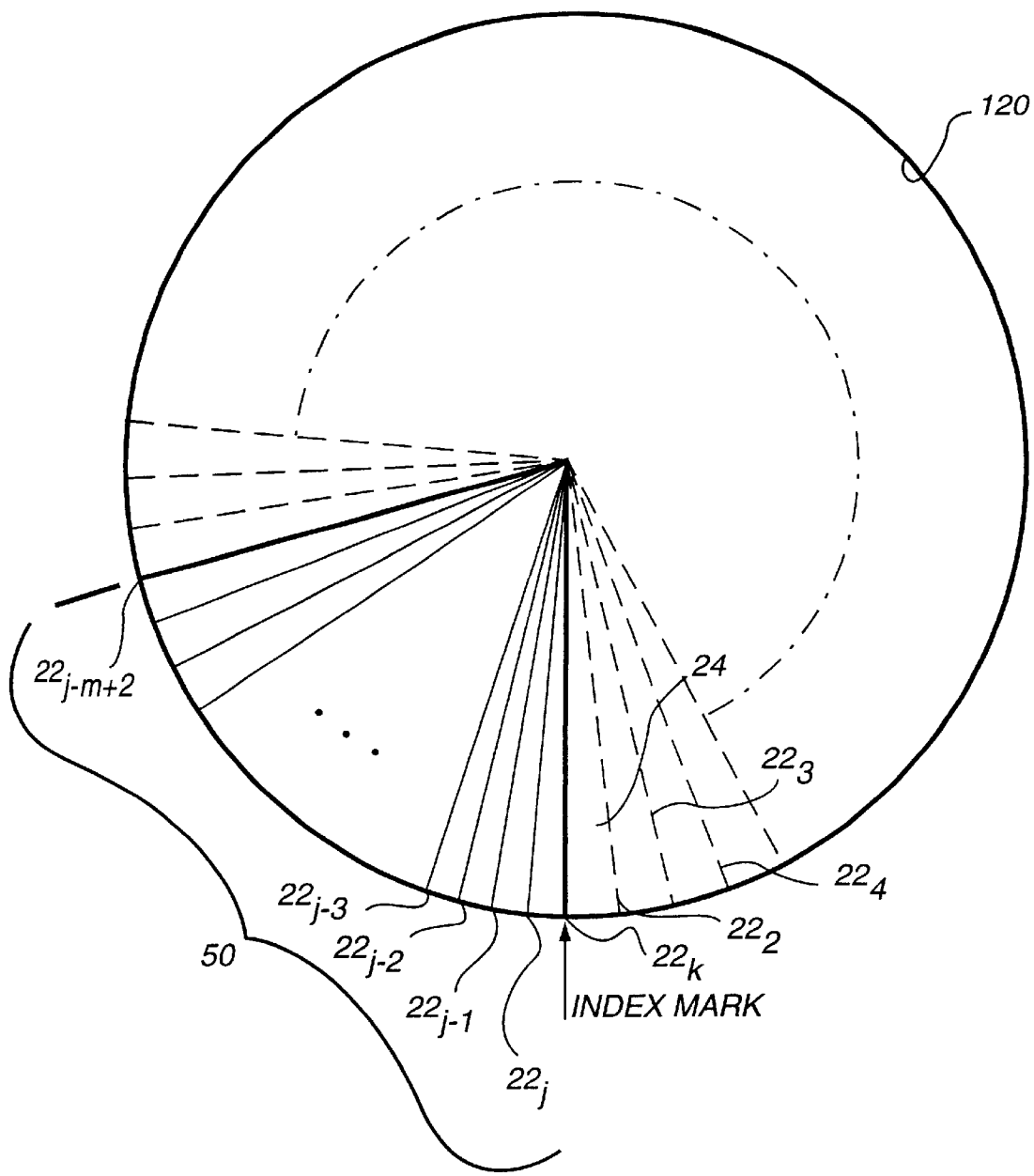
FIG. 1 is a schematic view of general aspects of a rotating storage medium according to an embodiment of the present invention.

FIG. 1 shows an example rotating magnetic storage medium 20 formatted in accordance with the present invention. The rotating storage medium 20 has plural servo wedges 22 pre-recorded at equal radial intervals. Between adjacent servo wedges 22 are wedges 24 of user data, typically comprising sectors. Only one such wedge 24 of user data is numbered in FIG. 1.

Figures 1A, 1B:
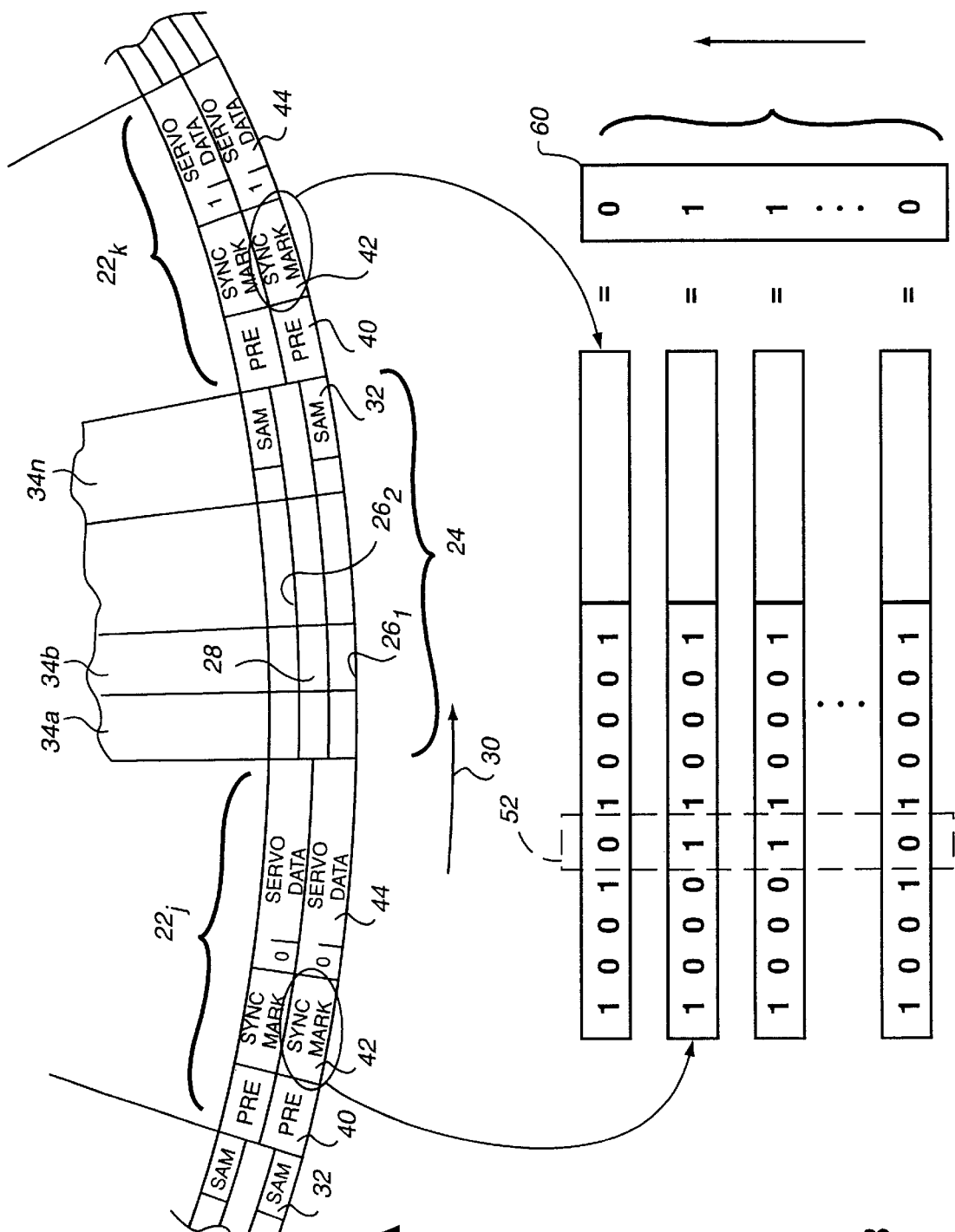
FIG. 1A is an enlarged view of portions of the rotating storage medium of FIG. 2.
FIG. 1B is diagrammatic view showing derivation of a sequence in a register of the present invention.

Portions of FIG. 1 are shown in more detail in FIG. 1A, particularly servo wedge $22_k$ and servo wedge $22_j$ and the wedge 24 of user data sandwiched therebetween. As also shown in FIG. 1A, rotating storage medium 20 has concentric (relatively circular) tracks, two perimeter-proximate most tracks $26_1$–$26_2$ being illustrated. Circular concentric gaps 28 exist between adjacent tracks 26. On each track 26, prior to each servo wedge 22 in the sense of rotation direction 30, a servo address mark (SAM) 32 is provided.

The tracks 26 of each of the wedges 24 of user data are divided into radial sectors 34, sectors $34_a$–$34_n$ being shown in FIG. 1A within the illustrated wedge 24 of user data. Although not shown herein, as understood by the person skilled in the art the wedges 24 of user data can further be zoned to optimize density of storage.

Each prior art servo wedge 22 begins with a preamble 40, which is followed (in order) by a synchronization mark 42 and a servo data field 44. For one of the servo wedges 22, on each track 26 the first bit of servo data field 44 is set to a value (e.g., one) indicating that the servo wedge 22 is an index wedge. For example, in FIG. 1A the first bit of servo data field 44 of servo wedge $22_k$ is set to one, which marks servo wedge $22_k$ as being an index wedge (the first bit of the servo data field 44 of servo wedge $22_k$ serving as the index mark). By contrast, on each track 26 the servo data field 44 of servo wedge $22_j$ (and all other servo wedges 22 except servo wedge $22_k$) is set to zero to evidence the fact that those servo wedges 22 do not include the index mark.

As shown in FIG. 1A, each servo wedge 22 is recorded with no gaps. Although not illustrated as such in FIG. 1A, it should be understood that servo data field 44 can include other information, such as (for example) a track number and servo wedge number. Typically the track number is expressed using a Grey Code sequence, with adjacent tracks having numbers which differ only by one bit position. The servo address mark (SAM) 32 is typically a blank space, e.g., an erase area in which no magnetic transitions are recorded, the area being longer than it would in data with a RLL code.

In accordance with the present invention, the rotating storage medium has an index mark-indicating sequence recorded thereon. On each track 26, the index mark-indicating sequence is comprised of bits distributed over plural servo wedges 22. In the illustrated embodiment, the index mark-indicating sequence is distributed over a specified number m of plural servo wedges, particularly over servo wedge $22_k$ and the preceding m−1 number of servo wedges (e.g., over servo wedge $22_k$, servo wedge $22_j$, and servo wedges $22_{j-1}$–servo wedge $22_{j-m+2}$) In FIG. 1, the m number of servo wedges in which the index mark-indicating sequence is distributed is shown as a subset 50 of the servo wedges of rotating storage medium 20. In the illustrated example embodiment of FIG. 1, the index mark-indicating sequence comprises bits distributed over the synchronization marks 42 of the servo wedges 22 of subset 50 of the servo wedges.

FIG. 1B shows example synchronization marks 42 for servo wedges $22_{j-m+2}$ through $22_k$. The nominal synchronization mark 42 has, in the illustrated embodiment, the value 1001010001. While the synchronization mark 42 is illustrated as having a length of ten bits and the illustrated example nominal value, it should be understand that the invention is not so limited, and that the synchronization mark 42 can have other lengths and other nominal values.

The synchronization mark 42 of the present invention is chosen so that it is fault tolerant. By fault tolerant is meant that another value, closely approximating but not exactly the same as the nominal synchronization mark value, will be presumed to be the synchronization mark. In the illustrated example wherein 1001010001 is the nominal synchronization mark 42, the drive will also recognize the value 1000110001 as being the synchronization mark. It will be observed that the value 1000110001 differs from the nominal synchronization mark 42 in the value of the underlined bit. The recognized value 1000110001 is an example of what is termed herein a variant but acceptable synchronization mark value.

In the present invention, a predetermined bit position in the synchronization mark is designated as a sequence entry bit from which a sequence entry value is acquired. In the illustrated example, the sequence entry bit is the fifth bit of the synchronization mark 42. In one embodiment, the sequence entry bit from which the sequence entry value is acquired is chosen so that the nominal synchronization mark 42 has a first value (e.g., zero) in the sequence entry bit, while the variant but acceptable synchronization mark value has a second value (e.g., one) in the sequence entry bit. In FIG. 1B, the sequence entry bit for each servo wedge for a set of consecutive servo wedges is framed by broken line 52.

FIG. 1B further shows that the sequence entry values, obtained from the sequence entry bits of m number of consecutive servo wedges 22, are concatenated in a register 60 to form a sequence. At the time shown in FIG. 1B, the synchronization mark 42 for servo wedge $22_k$ has the nominal synchronization mark 42 value of 1001010001; servo wedge $22_j$ has the variant but acceptable synchronization mark value 1000110001; servo wedge $22_{j-1}$ has the variant but acceptable synchronization mark value 1000110001; and servo wedge $22_{j-m+2}$ has the nominal synchronization mark 42 value of 1001010001. For simplicity, the synchronization mark values between servo wedge $22_{j-1}$; and servo wedge $22_{j-m+2}$ are not illustrated in FIG. 1B. Thus, at the time shown in FIG. 1B, the sequence in register 60 has the value "0 . . . 110". The last value in register 60 is obtained from the sequence entry bit of the synchronization mark 42 for servo wedge $22_k$, the penultimate value in register 60 is obtained from the sequence entry bit of the synchronization mark 42 for servo wedge $22_j$, and so forth.

Figure 2:
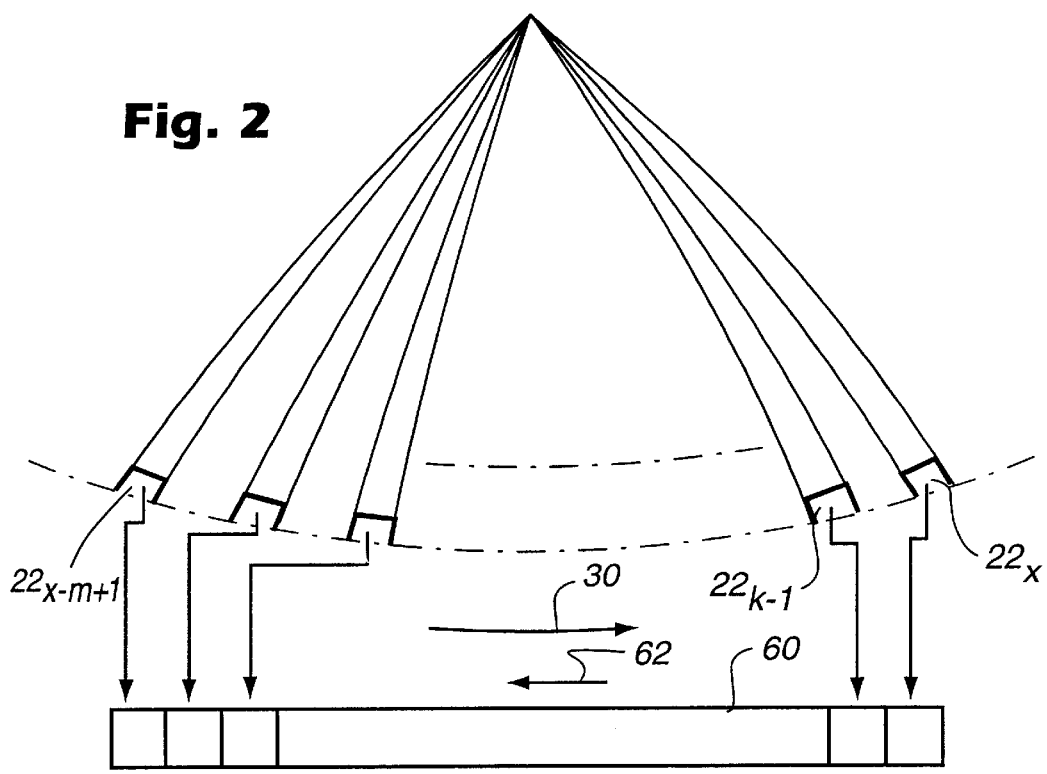
FIG. 2 is a schematic view showing portions of the rotating storage medium of FIG. 1 in conjunction with the register of the present invention of FIG. 1B.

In FIG. 1, the servo wedges 22 outside of subset 50 are illustrated as broken lines. In the example embodiment of FIG. 1, the servo wedges 22 outside of subset 50, the values in synchronization mark 42 are all the same (e.g., the nominal synchronization mark value of 1001010001). Thus, in this example, when the rotating storage medium 20 is situated so that none of the last m number of servo wedges 22 read from storage medium 20 are inside subset 50, all bits of the register 60 will have the same value (e.g., all zeroes). The register 60 is a shift register, so that as each servo wedge 22 is read, the sequence entry value from its sequence entry bit is shifted into register 60 and the oldest value in register 60 is shifted out. FIG. 2 shows that the sequence entry value from the sequence entry bit of the most recently read servo wedge $22_x$ is loaded into the beginning of register 60, with the shifting out of values in register 60 occurring in the manner understood with reference to arrow 62.

Figure 3:
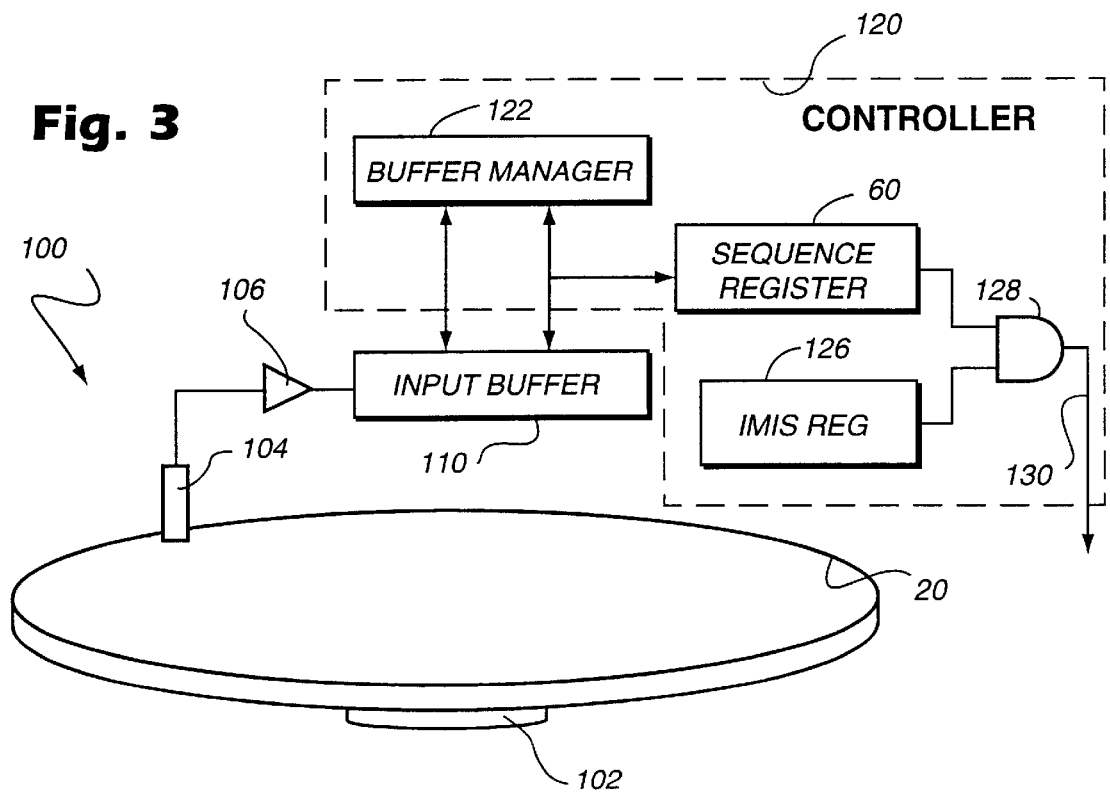
FIG. 3 is a schematic view of a rotating storage drive according to an embodiment of the invention.

FIG. 3 shows, in accordance with one embodiment, portions of a rotating storage drive 100 pertinent to the present invention. The rotating storage medium 20 is situated on a rotating mechanism 102. A transducer (e.g., magnetic or other type of head) 104 reads tracks of the rotating storage medium 20, and generates a read signal which is applied to amplifier 106. After other unillustrated signal conditioning understood by the person skilled in the art, the information acquired from the transducer (e.g., magnetic or other type of head) 104 is stored in a memory such as input buffer 110. The information in input buffer 110 is analyzed by a controller 120. The controller 120 includes, e.g., a memory manager 122. The memory manager 122 looks for the synchronization mark 42 in each servo wedge 22, and extracts the sequence entry value from the sequence entry bit thereof for entry into register 60. In the FIG. 3 embodiment, a predefined reference index mark-indicating sequence (IMIS) is stored in IMIS register 126. The values in register 60 and IMIS register 126 are compared by comparitor unit 128. The comparitor unit 128 outputs a index mark location signal on line 130 in accordance with whether the value in register 60 matches the index mark-indicating sequence in IMIS register 126. As understood from the foregoing, the match will occur when the drive 100 has read the distributed index mark-indicating sequence from the servo wedges 22 for the subset 50.

The particular value chosen to be the index mark-indicating sequence can be any appropriate value, and is preferably itself a fault tolerant value that can be recognized by comparitor unit 128.

In the illustrated embodiment, the number of plural servo wedges per track in subset 50 is thirty two (there being 128 servo wedges 22 on rotating storage medium 20). It should be understood that this number is not critical, and that a greater or lesser number can instead be utilized. Preferably the length of register 60 is equal to the length of the predefined reference index mark-indicating sequence. If the length of register 60 differs from the length of the predefined reference index mark-indicating sequence, comparitor 128 should compare only the most recent number of bits in register 60 equaling the length of the predefined reference index mark-indicating sequence.

In operation, a host device (e.g., host computer) requests that a certain logical block ID (LBID) be read from the rotating storage medium. The host generally does not know the particular physical location on the storage medium of the stored information corresponding to the LBID. Therefore, the drive maintains a table which is recorded and read from the rotating storage medium. The table is a directory for mapping LBIDs to physical sectors on the rotating storage medium. The LBID is mapped relative to a set of physical location information. For example, in a disk drive which handles plural rotating disks (with a surface of a disk being generally referred to as a platter), the set of physical location information to which the LBID is mapped can corresponding to a sector [e.g., servo wedge] number, a track number, and a platter.

After the rotating storage medium is rotated up to speed, the signal of a read head (e.g., transducer), after amplification, is rectified. The read signal is analyzed to locate the servo address mark (SAM) 32. Upon location of the servo address mark (SAM) 32, it is realized that a servo wedge 22 will be next read. In the servo wedge 22, the preamble 40 is first read, followed by the synchronization mark 42, followed by servo data field 44. Upon detecting the entire synchronization mark 42, a timer is set for locating the next servo wedge 22. Upon reading a servo wedge 22, the drive 100 makes an entry for the sequence in register 60, using the sequence entry value from the sequence entry bit of the synchronization mark 42 for that servo wedge 22. In reading the servo data field 44, a predetermined bit in the servo data field 44 of the servo wedge 22 (typically the first bit of the servo data field) is checked to ascertain if the servo wedge 22 is an index servo wedge or not.

Upon location of one servo wedge 22, using the timer the drive can count down the time to locate the next servo wedge 22 (without having to detect the servo address mark (SAM) 32 of the next servo wedge 22), since the format of rotating storage medium 20 is periodic and the speed of rotation is essentially constant. After reading the synchronization mark 42 of the next servo wedge 22, the timer is reset (in anticipation of reading yet another servo wedge 22). In like manner as previously, an entry is obtained from the sequence entry bit of the synchronization mark 42 to serve as the sequence entry value to be entered into register 60. The servo data field 44 of the servo wedge 22 is also checked, as the drive continues to look for the index mark.

The foregoing procedure continues in similar fashion as each servo wedge 22 is read and processed, shifting entries from the sequence entry bit of each servo wedge 22 into register 60. After the reading of each servo wedge 22, comparitor unit 128 checks whether the current value in register 60 equals the index mark-indicating sequence stored in IMIS register 126. When an equality (or fault tolerant equivalence) is noted by comparitor unit 128, the drive 100 realizes that the index mark has been found and generates the index mark location signal on line 130. After locating the index mark, using the directory table the sector corresponding to the sought LBID can be fetched from the rotating storage medium.

Thus, the sequence in register 60 is formed by extracting at least one bit from a predetermined position in synchronization mark 42 for each of the plural servo wedges. The particular sequence formed in register 60 upon reading the servo wedge which includes the index mark (e.g., upon reading the subset 50 of the servo wedges) should equal or be the fault-tolerant equivalent of the index mark-indicating sequence, and thus result in application of an index mark location signal on line 130.

Figure 3A:
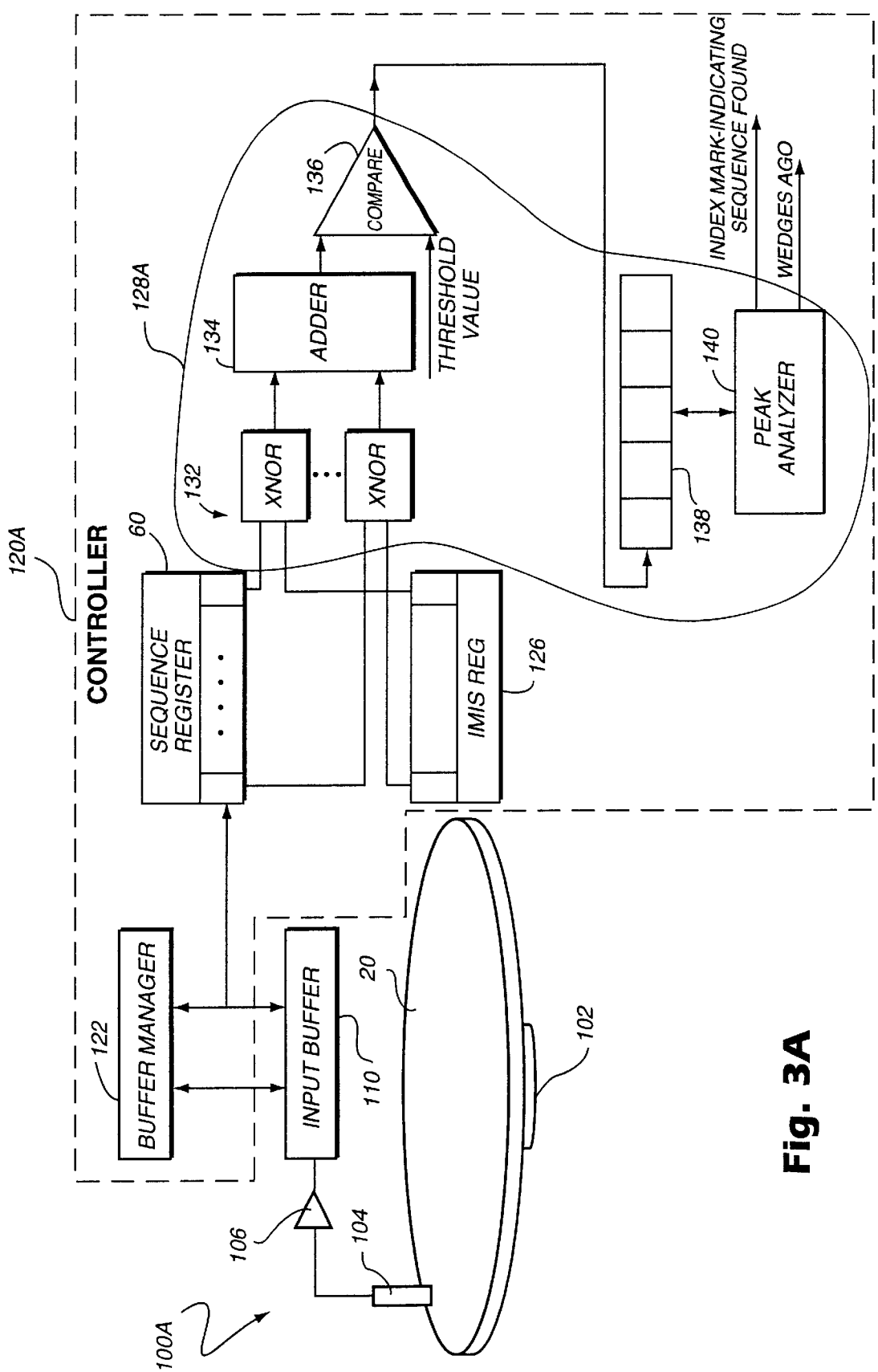
FIG. 3A is a schematic view of a rotating storage drive according to another embodiment of the invention.

FIG. 3A shows another embodiment of rotating storage drive 100A, wherein controller 120A has a slightly different constituency/operation. In particular, the comparitor 128A of controller 120A comprises a bank of XNOR gates 132, adder 134, threshold comparitor 136, peak window register 138, and peak analyzer 140. The comparitor 128A of controller 120A XNORs together corresponding bits of sequence register 60 and IMIS register 126 using the bank of XNOR gates 132. Each XNOR gate 132 generates a high output signal if the two bits which it receives are the same. All XNOR gates 132 (one for each bit in the sequence of register 60, e.g., thirty two XNOR gates 132 in the illustrated embodiment) have their outputs summed by adder 134. The sum determined by adder 134 is compared by threshold comparitor 136 with a threshold value. If the sum determined by adder 134 exceeds the threshold value, comparitor 136 outputs the sum into peak window register 138. Summations are fed via comparitor 136 to peak window register 138 as long as the sum exceeds the threshold value. The contents of peak window register 138 are monitored by peak analyzer 140, which determines when an absolute peak sum occurs (corresponding to location of the index mark-indicating sequence). The peak analyzer typically cannot determine when the absolute peak sum occurs until after the entry of a sum in peak window 138 which is less than a greater sum already in the peak window register 138. Therefore, the peak analyzer 138 outputs two signals. The first signal output by peak analyzer 138 indicates that the index mark-indicating sequence was found. The second signal output by peak analyzer 138 indicates how many wedges ago the absolute peak occurred (i.e., how many wedges ago the index mark-indicating sequence was found).

The operation of drive 100A of FIG. 3A thus slightly differs from that of drive 100 of FIG. 3. In essence, controller 120A of the FIG. 3A embodiment looks for the greatest correlation between the value in sequence register 60 and the predefined reference index mark-indicating sequence as stored in IMIS register 126. In some instances it may be that the greatest correlation is not determined until sometime after the index mark-indicating sequence recorded on the medium has been read.

Figure 5:
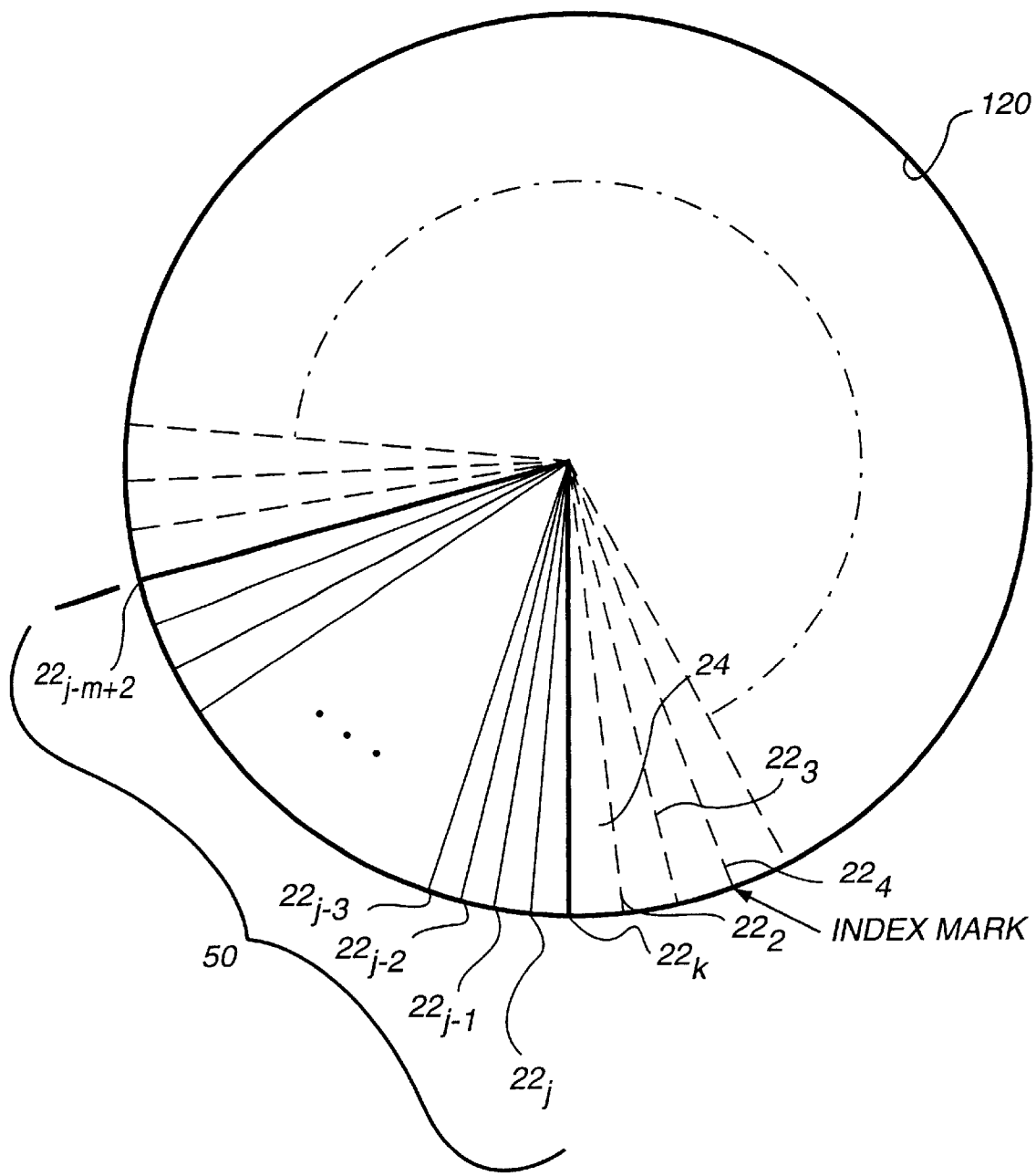
FIG. 5 is a schematic view of general aspects of a rotating storage medium according to another embodiment of the present invention.

FIG. 1, FIG. 1A, and FIG. 1B depict a situation in which the index mark resides in the very servo wedge which contributes the last bit of a sequence which will be recognized as the index mark-indicating sequence. In this regard, FIG. 1 shows index mark, residing in servo wedge $22_k$, as being declared upon reading of the sync mark 42 of servo wedge $22_k$. However, in accordance with other embodiments of the invention, the index mark can be physically offset by a known or predetermined numbers of servo wedges from the servo wedge which contributes the last bit of a sequence which will be recognized as the index mark-indicating sequence. For example, FIG. 5 shows an alternate situation in which the index mark occurs in servo wedge $22_4$, with the result that when the drive reads servo wedge $22_k$ and therein detects the last bit of the index mark-indicating sequence, the drive realizes that the index mark will actually occur physically on the medium three servo wedges later (i.e., an offset of three servo wedges between detection of the index mark-indicating sequence and the actual physical index mark). FIG. 5 thus shows an example in which detection of the index mark-indicating sequence precedes actual physical encounter of the index mark. It will be appreciated that other scenarios in which detection of the index mark-indicating sequence succeeds actual physical encounter of the index mark are also within the scope of the invention.

Figure 4:
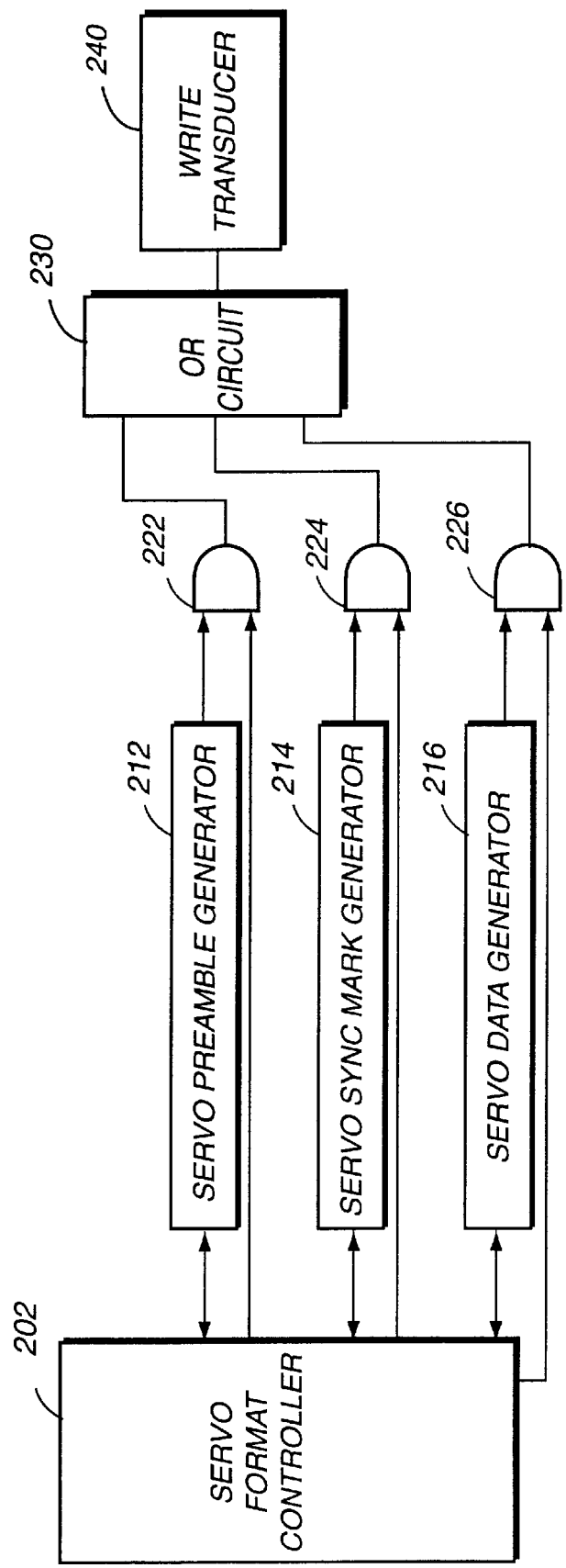
FIG. 4 is a schematic view of apparatus for pre-formatting a rotating storage medium according to an embodiment of the invention.

FIG. 4 shows an example formatting apparatus 200 which can be utilized to pre-format rotating storage medium 20 in accordance with the present invention. The formatting apparatus 200 comprises a servo format controller 202 which governs each of servo preamble generator 212; servo synchronization mark generator 214; and servo data generator 216. The servo format controller 202 further applies a gate signal to each of AND gates 222, 224, 226. The gate signals are applied to the AND gates 222, 224, 226 in order to sequence generation of preamble 40, synchronization mark 42, and servo data field 44. The servo preamble 40, synchronization mark 42, and servo data field 44 are applied, in order, to OR circuit 230. The output of OR circuit 230, including the entire servo wedge 22, are applied to a write transducer 240 which pre-records the servo wedge 22 on rotating storage medium 20. The servo format controller 202 times the writing of each servo wedge 22, so that the servo wedges 22 are pre-recorded at uniform radial locations on each track 26 of rotating storage medium 20.

As used herein, one example of pre-recorded servo is an embedded servo. As understood by those skilled in the art, embedded servo is recorded at a frequency other than that employed by the drive 100 in connection with user data.

The index mark-indicating sequence of the present invention can be any suitable sequence having good (impulse-like) autocorrection, e.g., a Barker sequence, for example. In one illustrative embodiment, the index mark-indicating sequence is a 30 bit Barker Sequence and has the variant but acceptable synchronization mark value in each of its thirty bits while all other servo wedges 22 outside subset 50 have the nominal synchronization mark value.

It will be appreciated that one type of rotating storage medium to which the invention is particularly applicable is magnetic rotating storage medium (e.g., magnetic disk). However, the invention is not limited to any particular medium type, and accordingly can apply to other types such as optical rotating storage medium (e.g., optical disk), for example.

Moreover, the controllers 120 and 120A as described above can take various forms. For example, these controllers can be implemented fully in a processor such as a microprocessor, can be implemented by other circuitry, or can be a hybrid implementation of processor and other circuitry.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotating storage medium having an index mark-indicating sequence recorded thereon, the index mark-indicating sequence comprised of bits distributed over plural servo wedges, the index mark-indicating sequence being comprised of one bit in each of a specified number of plural servo wedges per track, for each of the specified number of plural servo wedges the bit comprising the index mark-indicating sequence being recorded in a field of the servo wedge which does not include the index mark.

2. The rotating storage medium of claim 1, wherein the specified number of plural servo wedges per track is thirty two.

3. The rotating storage medium of claim 1, wherein the bits comprising the index mark-indicating sequence are recorded in sequence entry bits of synchronization marks of a specified number of plural servo wedges per track, the sequence entry bit being chosen so that a nominal synchronization mark has a first value in the sequence entry bit but a variant but acceptable synchronization mark has a second value in the sequence entry bit.

4. The rotating storage medium of claim 1, wherein the index mark-indicating sequence is fault tolerant.

5. The rotating storage medium of claim 1, wherein the index mark-indicating sequence is comprised of at least one bit in each of an integer m number of plural servo wedges per track, the m number of servo wedges including a servo wedge which contains the index mark and m−1 servo wedges positioned before the servo wedge which contains the index mark.

6. The rotating storage medium of claims 1, wherein the index mark-indicating sequence is comprised of at least one bit in each of an integer m number of plural servo wedges per track, and wherein the servo wedge which physically includes the index mark is offset from the m number of servo wedges by a predetermined number of servo wedges.

7. The rotating storage medium of claim 1, wherein for each of the specified number of plural servo wedges the bit comprising the index mark-indicating sequence is recorded in a field of the servo wedge which is fault tolerant.

8. The rotating storage medium of claim 1, wherein for each of the specified number of plural servo wedges the bit comprising the index mark-indicating sequence is recorded in a synchronization mark.

9. The rotating storage medium of claim 8, wherein the synchronization marks of the plural servo wedges are fault tolerant.

10. A drive for a rotating storage medium, the drive comprising:
   a transducer for reading servo wedges pre-recorded on the medium;
   a register in which is stored a sequence of servo information exacted from predetermined positions of plural servo wedges read by the transducer, the predetermined positions being in fields of the servo wedge which do not include the index mark;
   a comparitor which compares contents of the register with a predefined reference index mark-indicating sequence for ascertaining an index mark recorded on the medium.

11. The apparatus of claim 10, wherein the register is a shift register, and further comprising an input information manager which, for each of plural servo wedges read by the transducer, makes an entry in the shift register.

12. The apparatus of claim 11, wherein the entry for each of the servo wedges is obtained from a synchronization mark of the respective servo wedges.

13. The apparatus of claim 12, wherein the entry for each of the servo wedges is obtained from sequence entry bits of the synchronization marks of a specified number of plural servo wedges per track, the sequence entry bit being chosen so that a nominal synchronization mark has a first value in the sequence entry bit but a variant but acceptable synchronization mark value has a second value in the sequence entry bit.

14. The apparatus of claim 10, wherein the comparitor outputs a signal indicative of a location of the index mark when the sequence stored in the register corresponds to the predefined reference index mark-indicating sequence.

15. The apparatus of claim 10, wherein the comparitor comprises:
   a bank of gates which compare on a bit by bit basis contents of the register the predefined reference index mark-indicating sequence;
   an adder which sums outputs from bank of gates; a
   peak analyzer which determines when the sum from the adder indicates that the index mark-indicating sequence has been found.

16. The apparatus of claim 10, wherein a length of the register is equal to a length of the predefined reference index mark-indicating sequence.

17. The apparatus of claim 10, wherein the predetermined positions are in a field of the servo wedge which is fault tolerant.

18. A method of operating a drive for a rotating storage medium, the method comprising:
   forming a sequence from bits extracted from each of plural servo wedges read from the rotating storage medium, the sequence being formed using one bit in each of a specified number of plural servo wedges per track, for each of the specified number of plural servo wedges the bit comprising the index mark-indicating sequence being obtained from a field of the servo wedge which does not include an index mark;
   comparing contents of the sequence with a predefined reference index mark-indicating sequence;
   using the comparison to locate the index mark on the rotating storage medium.

19. The method of claim 18, further comprising extracting at least one bit from a synchronization mark for each of the plural servo wedges.

20. The method of claim 18, further comprising extracting at least one bit from a fault-tolerant synchronization mark for each of the plural servo wedges.

21. The method of claim 20, further comprising extracting at least one bit from a predetermined position of a synchronization mark for each of the plural servo wedges.

22. The method of claim 21, wherein the predetermined position is chosen so that a nominal synchronization mark has a first value in the predetermined position but a variant but acceptable synchronization mark has a second value in the predetermined position.

23. The method of claim 22, forming the sequence from at least one bit in each of an integer m number of plural servo wedges read per track from the rotating storage medium, the m number of servo wedges including a servo wedge which contains the index mark and m−1 servo wedges positioned before the servo wedge which contains the index mark.

24. The method of claim 23, wherein the predetermined number of consecutive servo wedges positioned before an index mark is thirty two.

25. The method of claim 18, further comprising forming the sequence in a register.

26. The method of claim 18, wherein for each of the specified number of plural servo wedges the bit comprising the index mark-indicating sequence is obtained from a field of the servo wedge which is fault tolerant.

27. A drive for a rotating storage medium, the drive comprising:
   a transducer for reading servo information pre-recorded in servo wedges of the medium;
   a controller which detects, from the servo information, an index mark-indicating sequence distributed over plural servo wedges and which outputs an index mark detection signal in accordance therewith, the index mark-indicating sequence being comprised of one bit in each of a specified number of plural servo wedges per track, for each of the specified number of plural servo wedges the bit comprising the index mark-indicating sequence being obtained from a field of the servo wedge which does not include the index mark.

28. The apparatus of claim 27, wherein the controller analyzes synchronization marks of the plural servo wedges to detect the index mark-indicating sequence.

29. The apparatus of claim 27, wherein the controller analyzes a predetermined position of a synchronization mark for each of the plural servo wedges.

30. The apparatus of claim 29, wherein the controller chooses the predetermined position so that a nominal synchronization mark has a first value in the predetermined position but a variant but acceptable synchronization mark has a second value in the predetermined position.

31. The apparatus of claim 27, wherein for each of the specified number of plural servo wedges the bit comprising the index mark-indicating sequence is obtained from a field of the servo wedge which is fault tolerant.

32. A controller for drive which transduces a rotating storage medium, the controller detecting, from servo information recorded on servo wedges of the rotating storage medium, an index mark-indicating sequence distributed over plural servo wedges and outputting an index mark detection signal in accordance therewith, the index mark-indicating sequence being comprised of one bit in each of a specified number of plural servo wedges per track, for each of the specified number of plural servo wedges the bit comprising the index mark-indicating sequence being obtained from a field of the servo wedge which does not include the index mark.

33. The apparatus of claim 32, wherein the controller analyzes synchronization marks of the plural servo wedges to detect the index mark-indicating sequence.

34. The apparatus of claim 32, wherein the controller analyzes a predetermined position of a synchronization mark for each of the plural servo wedges.

35. The apparatus of claim 34, wherein the controller chooses the predetermined position so that a nominal synchronization mark has a first value in the predetermined position but a variant but acceptable synchronization mark has a second value in the predetermined position.

36. The apparatus of claim 32, wherein the controller comprises:
a register in which is stored a sequence of servo information exacted from predetermined positions of plural servo wedges obtained from the storage medium;
a comparitor which compares contents of the register with a predefined reference index mark-indicating sequence for ascertaining an index mark recorded on the medium.

37. The apparatus of claim 36, wherein the register is a shift register, and wherein the controller further comprises an input information manager which, for each of plural servo wedges read by the transducer, makes an entry in the shift register.

38. The apparatus of claim 37, wherein the entry for each of the servo wedges is obtained from a synchronization mark of the respective servo wedges.

39. The apparatus of claim 37, wherein the entry for each of the servo wedges is obtained from sequence entry bits of the synchronization marks of a specified number of plural servo wedges per track, the sequence entry bit being chosen so that a nominal synchronization mark has a first value in the sequence entry bit but a variant but acceptable synchronization mark value has a second value in the sequence entry bit.

40. The apparatus of claim 37, wherein the comparitor outputs a signal indicative of a location of the index mark when the sequence stored in the register corresponds to the predefined reference index mark-indicating sequence.

41. The apparatus of claim 37, wherein a length of the register is equal to a length of the predefined reference index mark-indicating sequence.

42. The apparatus of claim 36, wherein the comparitor comprises:
a bank of gates which compare on a bit by bit basis contents of the register the predefined reference index mark-indicating sequence;
an adder which sums outputs from bank of gates; a peak analyzer which determines when the sum from the adder indicates that the index mark-indicating sequence has been found.

43. The apparatus of claim 32, wherein for each of the specified number of plural servo wedges the bit comprising the index mark-indicating sequence is obtained from a field of the servo wedge which is fault tolerant.

44. Apparatus for pre-formatting a rotating storage medium so that the rotating storage medium has an index mark-indicating sequence recorded thereon, the index mark-indicating sequence comprised of bits distributed over plural servo wedges, the index mark-indicating sequence being comprised of one bit in each of a specified number of plural servo wedges per track, for each of the specified number of plural servo wedges the bit comprising the index mark-indicating sequence being recorded in a field of the servo wedge which does not include the index mark.

45. The apparatus of claim 44, wherein the specified number of plural servo wedges per track is thirty two.

46. The apparatus of claim 44, wherein the bits comprising the index mark-indicating sequence are recorded in synchronization marks of a specified number of plural servo wedges per track.

47. The apparatus of claim 46, wherein the synchronization marks of the plural servo wedges are fault tolerant.

48. The apparatus of claim 44, wherein the bits comprising the index mark-indicating sequence are recorded in sequence entry bits of synchronization marks of a specified number of plural servo wedges per track, the sequence entry bit being chosen so that a nominal synchronization mark has a first value in the sequence entry bit but a variant but acceptable synchronization mark has a second value in the sequence entry bit.

49. The apparatus of claim 44, wherein the index mark-indicating sequence is fault tolerant.

50. The apparatus of claim 44, wherein for each of the specified number of plural servo wedges the bit comprising the index mark-indicating sequence is recorded in a field of the servo wedge which is fault tolerant.

51. Apparatus for pre-formatting a rotating storage medium comprising:
a write transducer;
a servo format controller which controls the write transducer during a pre-formatting operation whereby the rotating storage medium has an index mark-indicating sequence recorded thereon by the write transducer, the index mark-indicating sequence being comprised of bits distributed over plural servo wedges, the index mark-indicating sequence being comprised of one bit in each of a specified number of plural servo wedges per track, for each of the specified number of plural servo wedges the bit comprising the index mark-indicating sequence being recorded in a field of the servo wedge which does not include the index mark.

52. The apparatus of claim 51, further comprising a servo sync mark generator, and wherein the servo format controller controls the servo sync mark generator whereby the index mark-indicating sequence is recorded in servo sync marks in selected servo wedges on the rotating storage medium.

53. The apparatus of claim 52, wherein selected servo wedges include the servo wedge containing the index mark and an integer m−1 number of servo wedges preceding the servo wedge containing the index mark.

54. The apparatus of claim 51, wherein for each of the specified number of plural servo wedges the bit comprising the index mark-indicating sequence is recorded in a field of the servo wedge which is fault tolerant.

* * * * *